April 8, 1930.   J. R. REPLOGLE   1,753,945
THERMOSTAT CONTROLLER
Filed Aug. 22, 1927   2 Sheets-Sheet 1
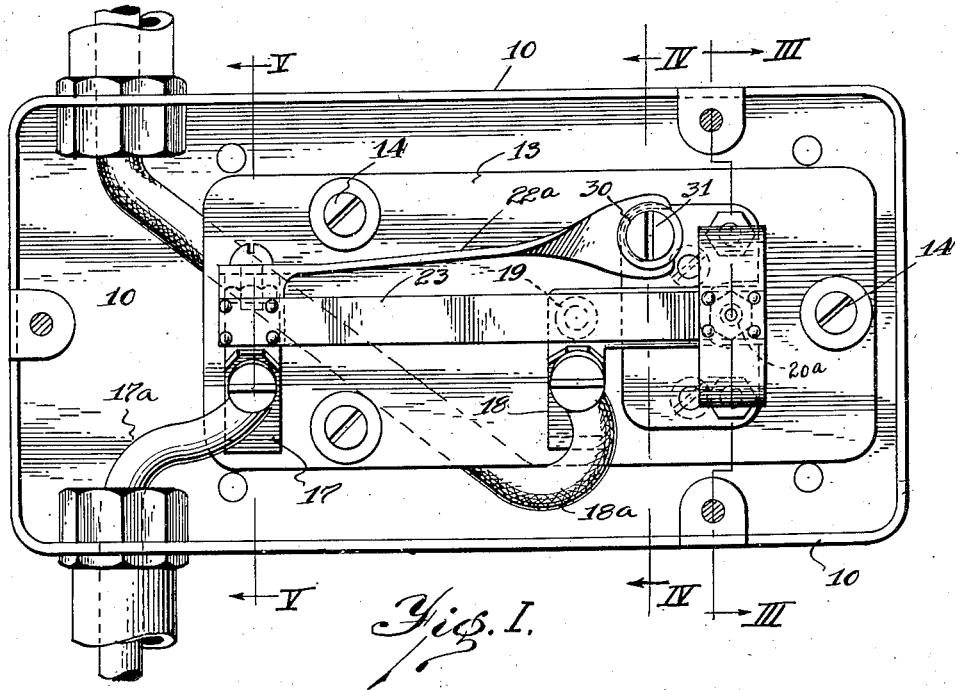
Fig. I.
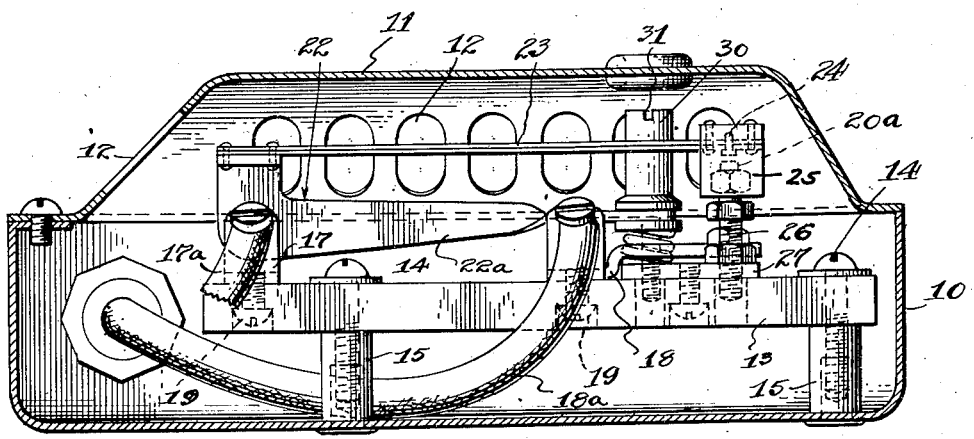
Fig. II.
Inventor
John R. Replogle.
BY
Hart & Lind
ATTORNEYS.

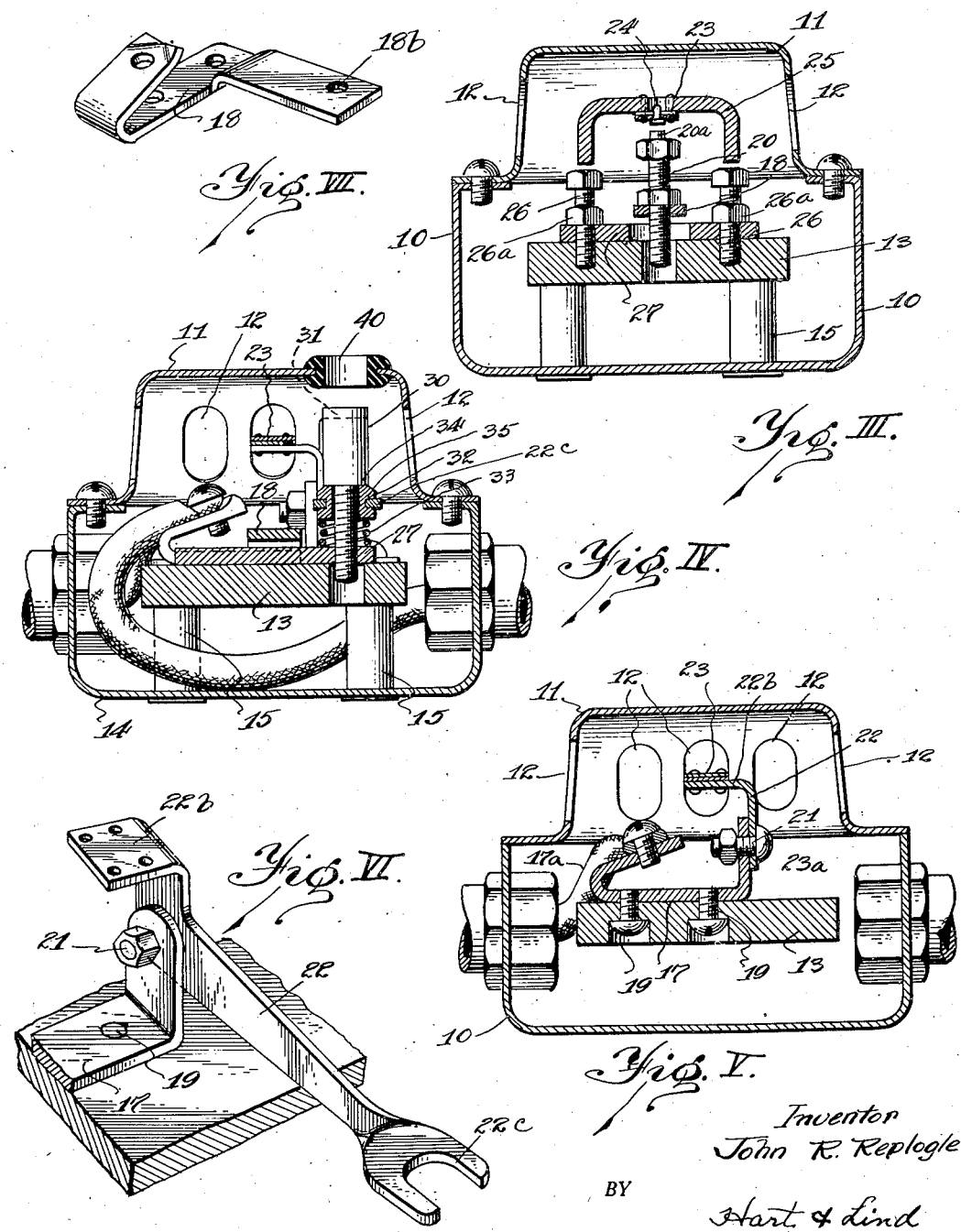

Patented Apr. 8, 1930

1,753,945

UNITED STATES PATENT OFFICE

JOHN R. REPLOGLE, OF DETROIT, MICHIGAN, ASSIGNOR TO KELVINATOR CORPORATION, OF DETROIT, MICHIGAN, A CORPORATION OF MICHIGAN

THERMOSTAT CONTROLLER

Application filed August 22, 1927. Serial No. 214,543.

This invention relates to automatic control mechanism for mechanical refrigerating apparatus, and more particularly to control mechanism for a circuit utilized with fans for propelling air in a chamber to be refrigerated.

Mechanical refrigerating apparatus generally includes automatic control mechanism which can be adjusted to cause the prime mover to operate during a predetermined temperature range within the chamber to be cooled. With such systems in which air in the chamber circulates in direct contact with the evaporator, there is an economical advantage in utilizing a fan to forcibly move the air before and during a portion of the operating period of the refrigerating mechanism, because a more rapid heat transfer takes place and therefore shorter operation periods are necessary. Fans used for this purpose are now automatically controlled by thermostat operated switches, but they are not economical because they cannot be adjusted to operate in a plurality of temperature ranges which are properly timed with the variable temperature ranges at which the refrigerating mechanism is automatically controlled to operate and therefore unnecessary operation and power consumption result.

An object of my invention is to provide control mechanism for an air circulating fan, in refrigerating systems of the character above set forth, which can be adjusted to function in a variable time relation with the operating period of the refrigerating apparatus.

A further object of my invention is to provide an adjustable automatic switch for the circuit leading to a fan which can be regulated to operate the fan within variable ranges and at different temperatures.

Another object of my invention is to provide a switch of the character in which described contact is made and broken with a snap action.

These and other objects will appear in the following description of an embodiment of the invention.

In the accompanying drawings:

Figure I is a plan view of the controller assembled in the base section of a casing.

Figure II is a sectional view showing the controller in elevation.

Figures III, IV and V respectively are transverse sectional views taken respectively on lines III—III, IV—IV and V—V respectively of Figure II.

Figure VI is a perspective detailed view of the terminal support of the switch.

Figure VII is a perspective detailed view of the terminal bracket which supports the fixed contact post.

An automatic control apparatus embodying this invention is arranged within a chamber to be refrigerated, for controlling the operating periods of a fan. This control apparatus is carried within a casing base 10 which is enclosed by a removable cover 11 having openings 12 therein to allow air in the chamber to circulate through the casing. The switch mechanism is supported upon and attached to a base 13, constructed of insulating material such as bakelite, which is removably secured by the screws 14 upon the posts 15 which are rigidly attached to the casing base.

The switch mechanism carried by the base includes terminal members 17 and 18 to which the conductors 17ª and 18ª are respectively attached, such conductors extending to a suitable source of electrical supply. The terminal members 17 and 18 are each provided with a flat portion which is attached to the base 13 by the screws 19. The terminal bracket 18 is provided with a threaded aperture 18ᵇ for receiving a stud 20, having a head from which a platinum contact member 20ª projects. The terminal member 17 is turned upwardly for supporting a bracket arm 22 which is pivotally attached by the connection 21. One end 22ᵇ of the bracket arm is bent horizontally and one end of a bi-metal thermostat bar 23 is secured by rivets thereto, while the other end 22ᶜ of the bracket arm is forked and turned to extend in a horizontal plane. The free end of the thermostat bar is positioned to overlie the contact stud 20 carried by the contact member 18, and a contact element 24 is secured thereto. The contact elements 20 and 24 when moved into engagement complete the circuit to the fan motor.

through the thermostat bar and contact elements 17 and 18 and conductors 17ᵃ and 18ᵃ. The thermal element 23 is preferably formed of two resilient strips of metal having different coefficients of expansion, so that when exposed to temperature changes in the air, unequal expansion causes bowing. In this manner an increase in temperature causes the thermal element to bow downwardly moving the contact point 24 toward the point 20.

I associate magnetic means with the thermal bar 23 in order to give a snap action to the movement of the contact mechanism and also to provide a lost motion effect which provides for a temperature range between the actual opening and closing of the switch. To this end a permanent magnet 25, of inverted U shape, is secured to the movable contact end of the thermal member 23 and the ends thereof are located in a plane above a pair of studs 26 formed of any magnetic material, such as steel. The studs are screwed through a plate 27 of magnetic material and extend into apertures in the insulation base 13, lock nuts 26ᵃ adjustable on the studs being provided to engage the plate to maintain the adjustment of the studs.

The thermal element is effected by a predetermined high temperature to bow toward contact 20, and as the ends of the magnet 25 approach the studs 26 the magnetic attraction therebetween increases until it overcomes the spring tension of the thermal element, thereby causing a snap action movement of the contact 24 with the contact 20. In order to break the contact between the members 20 and 24, the tension exerted by the thermal member straightening out, as temperature decreases, must overcome the attractive force between the members 25 and 26 whereupon the contact will be broken with a snap action.

A range of temperature between the point at which contact is made and the point at which it is broken exists because of the fact that the force required by the bi-metallic member to break the contact is greater than the force required to be exerted thereon to make contact originally, and therefore as the studs 26 are adjusted toward or away from the member 25 the temperature range will be respectively increased or decreased. Obviously the distance between the contact members 25 and 26 must always be equal to or greater than the distance between the contacts 24 and 25.

While it is desirable to regulate the range of temperature in which the automatic controller causes the fan to operate, it is also necessary to regulate the controller so that the fan will be caused to start operation at a desired temperature and I have provided for such condition. A screw 30, having a slot 31 in its head and a reduced threaded shank, is screwed into the plate 27. A bushing 32 of insulating material is fitted upon the reduced shank of the screw and a coil spring 33 is interposed between the bushing and the plate for yieldingly forcing the bushing against the shoulder 34 of the screw. The bushing is formed with an annular groove 35 in which the forked end 22ᶜ of the pivoted arm 22 engages. By adjusting the screw 30 relative to the plate 27, the arm 22 will be moved upon its pivotal connection 21 and thereby moving the thermal bar 23 so that the distance between the contacts 24 and 20 is varied. The greater distance the contacts are thus normally spaced, the higher the temperature in the chamber will have to be to cause the contacts to engage, and the temperature at which the contacts will close the circuit can thus be determined by a proper adjustment of the screw 30. The casing top is provided with an aperture, so that a screw driver can be inserted to adjust the screw 30 without removing the casing top.

It will be seen that I have provided a switch mechanism which can be adjusted to operate to close a circuit at a desired temperature, and which can also be adjusted to keep the circuit closed within a desired range of temperature relative to temperature at which it is set to close. The two adjustments are separate and either can be made without affecting the other. With the switch mechanism herein described, the fan can therefore be regulated to operate in a period relative to the operation of the refrigerating mechanism as may be desired and with proper regulation in this respect economical operation of both the fan and the refrigerating apparatus is obtained.

Various changes can be made in the structure herein described without departing from the spirit of my invention and the scope of the claims.

What I claim is:

1. In an automatically actuated switch mechanism, a stationary contact member, a heat responsive member having one end rigidly secured, a contact member carried by the free end of said heat responsive member, said contact members being connected with a source of electrical energy, magnetic means for assisting the effect of heat on said heat responsive member for causing engagement of said contact members, said heat responsive member and said magnetic means being independently adjustable to regulate their effect upon the engagement of said contact members.

2. In an automatically actuated switch mechanism, relatively movable contact members connected with a source of electrical energy, thermostat means for moving one of said contact members relative to the other contact member, and magnetic means for assisting said thermostat means in moving said movable contact member, said magnetic and thermostat means being independently adjustable to vary their effect upon the movement of said movable contact.

3. An automatically actuated switch mechanism comprising, a pair of switch elements having relative movement, one of said elements being movable and provided with a permanent magnet, means arranged to be effected by the magnetic forces set up around said permanent magnet to effect the closing of said switch when said magnetic forces are increased sufficiently to overcome the forces tending to keep the switch open, and means for adjusting said studs to vary the effect of said magnetic field which tends to draw the studs and magnet together for controlling the operative periods of said power appliance.

In testimony whereof I hereunto affix my signature.

JOHN R. REPLOGLE.